USOO5155808A

United States Patent [19]

Shimizu

[11] Patent Number: 5,155,808
[45] Date of Patent: Oct. 13, 1992

[54] SYSTEM FOR COOPERATIVELY EXECUTING PROGRAMS BY SEQUENTIALLY SENDING A REQUESTING MESSAGE TO SERIALLY CONNECTED COMPUTERS

[75] Inventor: Noboru Shimizu, Tokyo, Japan

[73] Assignee: NEC Corporation, Tokyo, Japan

[21] Appl. No.: 379,017

[22] Filed: Jul. 11, 1989

[30] Foreign Application Priority Data

Jul. 11, 1988 [JP] Japan .................. 63-170863
Jul. 29, 1988 [JP] Japan .................. 63-190001

[51] Int. Cl.⁵ ............................................ G06F 13/00
[52] U.S. Cl. ................................ 395/200; 364/229.4;
364/230.4; 364/284.3; 364/DIG. 1
[58] Field of Search ............ 340/825.05; 395/200;
364/200 MS File, 900 MS File

[56] References Cited

U.S. PATENT DOCUMENTS

| 3,614,745 | 10/1971 | Podvin et al. ............... 364/200 |
| 4,366,479 | 12/1982 | Mori et al. ............... 340/825.05 |
| 4,462,075 | 7/1984 | Mori et al. ............... 364/200 |
| 4,648,061 | 3/1987 | Foster ............... 364/900 |
| 4,698,629 | 10/1987 | Mori et al. ............... 340/825.05 |
| 4,719,564 | 1/1988 | Hara ............... 364/200 |
| 4,754,395 | 6/1988 | Weisshaar et al. ............... 364/200 |
| 4,941,084 | 7/1990 | Terada et al. ............... 364/200 |

Primary Examiner—Thomas C. Lee
Assistant Examiner—Paul Harrity
Attorney, Agent, or Firm—Foley & Lardner

[57] ABSTRACT

In a computer network system comprising a plurality of computers connected to a communication line, each computer executes a program including a function. In one of the computers, a judging section is supplied with a request indicative of the function from the program and judges whether or not the function can be executed by the above-mentioned one to produce a non-executable signal when the function cannot be executed by the above-mentioned one. Responsive to the non-executable signal, a request command generating section generates an original request command which is transmitted to at least one other computer as a transmission request command by a command transmitting section. A command receiving section of the other computer receives the transmission request command as a received request command, which an executing section executes to produce an execution result generated by a reply command generating section as an original reply command transmitted by the command transmitting section as a transmission reply command back to the above-mentioned one. The command receiving section of the above-mentioned one receives the transmission reply command as a received reply command which is returned to the program as the execution result by a returning section.

6 Claims, 10 Drawing Sheets

SYSTEM FOR COOPERATIVELY EXECUTING PROGRAMS BY SEQUENTIALLY SENDING A REQUESTING MESSAGE TO SERIALLY CONNECTED COMPUTERS

BACKGROUND OF THE INVENTION

This invention relates to a computer network system comprising a plurality of computers connected to a communication line.

In such a computer network system, a program includes, in general, one or more functions, such as jobs or external procedures, as known in the art. Each computer may or may not be capable of executing the functions.

In a conventional computer network system, each computer cannot execute a program which includes one or more functions, if the computer in question cannot execute any one of the functions. In this event, the computer gives up execution of the program in question.

Another conventional computer network system comprises a central computer and a plurality of local computers connected together to a communication line. The central computer can execute all of the functions included in a program. Each of the local computers is called a remote terminal. With this structure, each remote terminal sends one or more functions to the central computer and makes the central computer execute the functions in question. Therefore, such a computer network system is called a remote job entry (RJE) system in the art.

At any rate, a program should be executed by a particular computer, such as the central computer, which is capable of executing all of the functions included in the program in question if the remaining computers except for the particular computer are not able to execute the program in question. Accordingly, the conventional computer network system is disadvantageous, in that it is troublesome to move the program from one to another computer, and that it takes a long time to execute the program.

SUMMARY OF THE INVENTION

It is an object of this invention to provide a computer network system comprising a plurality of computers each of which is capable of executing a program including one of functions by using remaining computers.

It is another object of this invention to provide a computer network system of the type described, which is capable of executing a program without trouble to move the program from one to another computer.

It is still another object of this invention to provide a computer network system of the type described, which is capable of executing a program in a short time.

A computer network system to which this invention is applicable, comprises first through N-th computers connected to a communication line where N represents a predetermined natural number which is not less than two. An n-th computer executes an n-th program which includes one of a plurality of functions, where n represents each of 1 through N.

In the computer network system according to a first aspect of this invention, the n-th computer comprises judging means supplied with request indicative of a particular one of the functions from the n-th program for judging whether or not the particular function cannot be executed by the n-th computer in response to the request, the judging means producing the request as a non-executable signal when the particular function cannot be executed by the n-th computer, request command generating means connected to the judging means and responsive to the non-executable signal for generating an original request command indicative of the request, and request transmitting means connected to the request command generating means and to the communication line for transmitting, as a transmission request command, the original request command through the communication line to an m-th computer which is at least one of the first through the N-th computers except for the n-th computer, the m-th computer being capable of executing the particular function. The m-th computer comprises request receiving means connected to the communication line for receiving the transmission request command via the communication line as a received request command, executing means connected to the request receiving means and responsive to the received request command for executing the particular function indicated by the received request command to produce an execution result, reply command generating means connected to the executing means and responsive to the execution result for generating an original reply command indicative of the execution result, and reply transmitting means connected to the reply command generating means and to the communication line for transmitting, as a transmission reply command, the original reply command through the communication line to the n-th computer. The n-th computer further comprises reply receiving means connected to the communication line for receiving the transmission reply command via the communication line as a received reply command and reply returning means connected to the reply receiving means and responsive to the received reply command for returning the execution result indicated by the received reply command to the n-th program.

In the computer network system according to a second aspect of this invention, the n-th computer comprises judging means supplied with a request indicative of a particular one of the functions from the n-th program for judging whether or not the particular function can be executed by the n-th computer in response to the request, the judging means producing the request as a non-executable signal when the particular function can not be executed by the n-th computer, request command generating means connected to the judging means and responsive to the non-executable signal for generating an original request command indicative of the request, and request transmitting means connected to the request command generating means and to the communication line for transmitting, as a transmission request command, the original request command through the communication line to remaining computers which are the first through the N-th computers except for the n-th computer. An m-th computer is one of the remaining computers. The m-th computer comprises request receiving means connected to the communication line for receiving the transmission request command via the communication line as a received request command, deciding means connected to the request receiving means for deciding whether or not the particular function can be executed by the m-th computer in response to the received request command, the deciding means producing the received request command as an executable signal when the particular function can be executed by the m-th computer, executing means connected to the deciding means and responsive to the executable signal for executing the particular function indicated by the executable signal to produce an execution result, reply command generating means connected to the executing means and responsive to the execution result for generating an original reply command indicative of the execution result, and reply transmitting means connected to the reply command generating means and to the communication line for transmitting, as a transmission reply command, the original reply command through the communication line to the n-th computer. The n-th computer further comprises reply receiving means connected to the communication line for receiving the transmission reply command via the communication line as a received reply command and reply returning means connected to the reply receiving means and responsive to the received reply command for returning the execution result indicated by the received reply command to the n-th program.

A computer network system, to which this invention is applicable, comprises first through N-th computers connected by a loop-shaped communication line for carrying out unidirectional communications through the communication line where N represents a predetermined natural number not less than two. The n-th computer executes an n-th program which includes one of a plurality of functions, where n represents each of 1 through N. The n-th computer transmits an n-th transmission signal to an (n+1)-th computer. The (n+1)-th computer is the first computer when the n-th computer is the N-th computer. The n-th computer receives, as an n-th reception signal, an (n−1)-th transmission signal from an (n−1)-th computer. The (n−1)-th computer is the N-th computer when the n-th computer is the first computer.

In the computer network system according to a third aspect of this invention, the n-th computer comprises n-th judging means supplied with an n-th request indicative of a particular one of the functions from the n-th program for judging whether or not the particular function can be executed by the n-th computer in response to the n-th request, the n-th judging means producing the n-th request as an n-th non-executable signal when the particular function cannot be executed by the n-th computer, n-th request command generating means connected to the n-th judging means and responsive to the n-th non-executable signal for generating an n-th original request command indicative of the n-th request, and n-th request transmitting means connected to the n-th request command generating means and to the communication line for transmitting, as an n-th transmission request command being the n-th transmission signal, the n-th original request command through the communication line to the (n+1)-th computer. An m-th computer is one of remaining computers which are the first through the N-th computers except for the n-th computer. The m-th computer comprises m-th request receiving means connected to the communication line for receiving the n-th transmission request command via the communication line from an (m−1)-th computer as an n-th received request command being an m-th reception signal, m-th judging means connected to the m-th request receiving means for judging whether or not the particular function can be executed by the m-th computer in response to the n-th received request command, the m-th judging means producing the n-th received request command as an n-th executable signal when the particular function can be executed by the m-th computer. m-th executing means connected to the m-th judging means and responsive to the n-th executable signal for executing the particular function indicated by the n-th executable signal to produce an n-th execution result, m-th reply command generating means connected to the m-th executing means and responsive to the n-th execution result for generating an n-th original reply command indicative of the n-th execution result, and m-th reply transmitting means connected to the m-th reply command generating means and to the communication line for transmitting, as an n-th transmission reply command being an m-th transmission signal, the n-th original reply command through the communication line to an (m+1)-th computer. The n-th computer further comprises n-th reply receiving means connected to the communication line for receiving the n-th transmission reply command via the communication line from the (n−1)-th computer as an n-th received reply command being the n-th reception signal and the n-th reply returning means connected to the n-th reply receiving means and responsive to the n-th received reply command for returning the n-th execution result indicated by the n-th received reply command to the n-th program.

DESCRIPTION OF THE PREFERRED EMBODIMENTS

Figure 1:
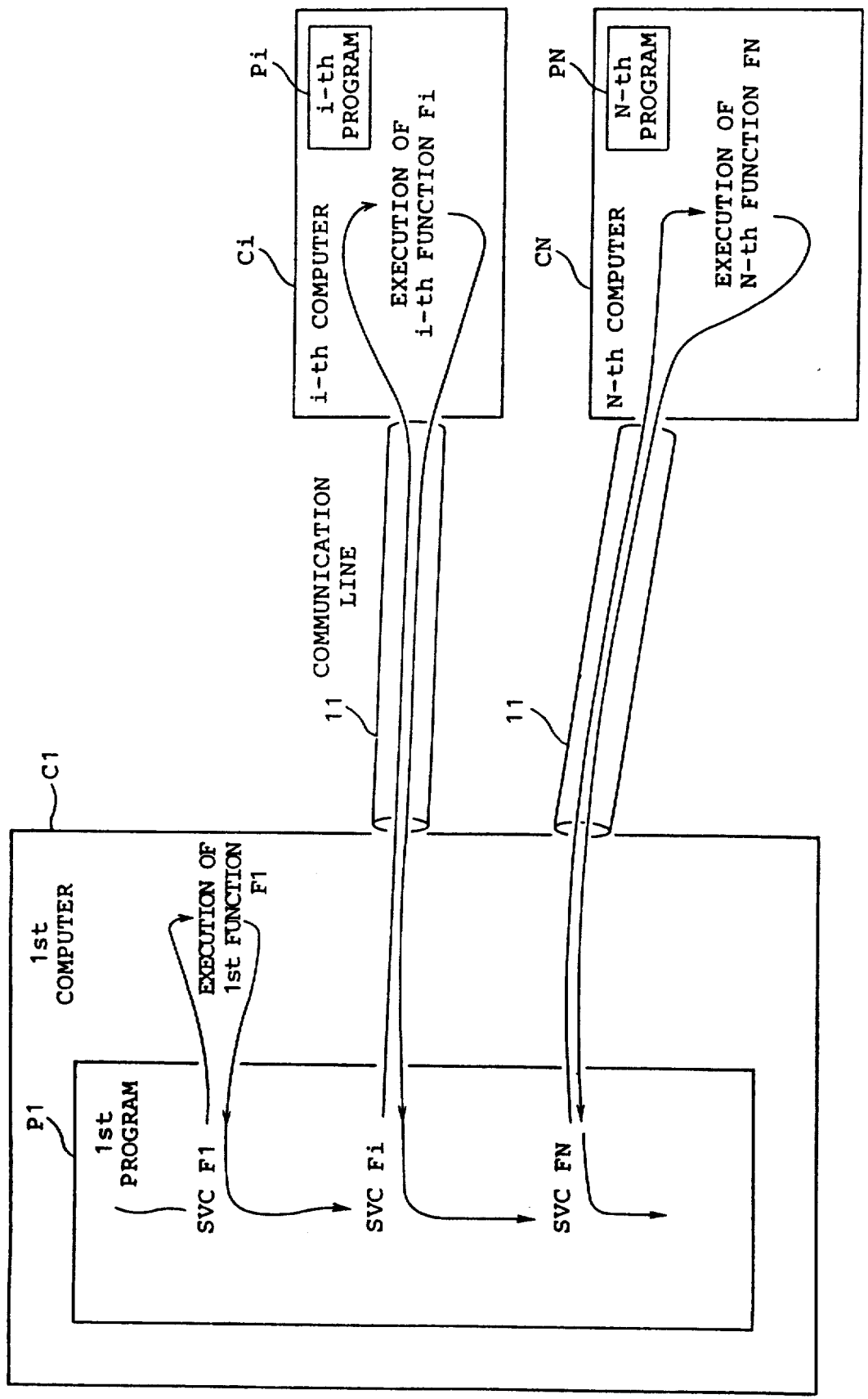
FIG. 1 shows a block diagram of a computer network system according to a first embodiment of this invention.

Referring to FIG. 1, the description will begin with a computer network system according to a first embodiment of the present invention. As will become clear as the description proceeds, the description is common to other embodiments of this invention. The computer network system comprises first through N-th computers C1, ... Ci, ..., CN which are connected to a communication line 11 where N represents a predetermined natural number which is not less than two. It is to be noted here that the communication line 11 is a net-shaped communication line which connects the first through the N-th computers C1 to CN one another in the manner depicted. Alternatively, the communication line 11 may be single open-ended or loop-shaped line to which the first through the N-th computers are connected. As a further alternative, the communication line 11 may be a loop-shaped line which carries out unidirectional communication consecutively from the first computer C1 to the N-th computer CN and back to the first computer C1.

The first through the N-th computers C1 to CN are assigned with first through N-th computer names representative of the first through the N-th computers C1 to CN, respectively. An n-th computer Cn of the n-th computer name executes an n-th program Pn, where n represents each of 1 through N. The n-th program Pn includes one of a plurality of functions, such as jobs or external procedures, as known in the art. In the illustrated example, the functions comprise first through N-th functions F1, ..., Fi, ..., FN which are assigned with first through N-th function names representative of the first through the N-th functions F1 to FN, respectively. In addition, the first program P1 includes the first function F1 of the first function name, an i-th function Fi of the i-th function name, and the N-th function FN of the N-th function name. Each computer may or may not be capable of executing all the functions. In the illustrated example, the first computer C1 of the first computer name is capable of executing only the first function F1 of the first function name. The i-th computer Ci of the i-th computer name is capable of executing only the i-th function Fi of the i-th function name. The N-th computer CN of the N-th computer name is capable of executing only the N-th function FN of the N-th function name.

More in detail, the computer network system is implemented in accordance with first through third embodiments of this invention. At first, the first embodiment will be described. The second and the third embodiments will be described later.

Figure 2:
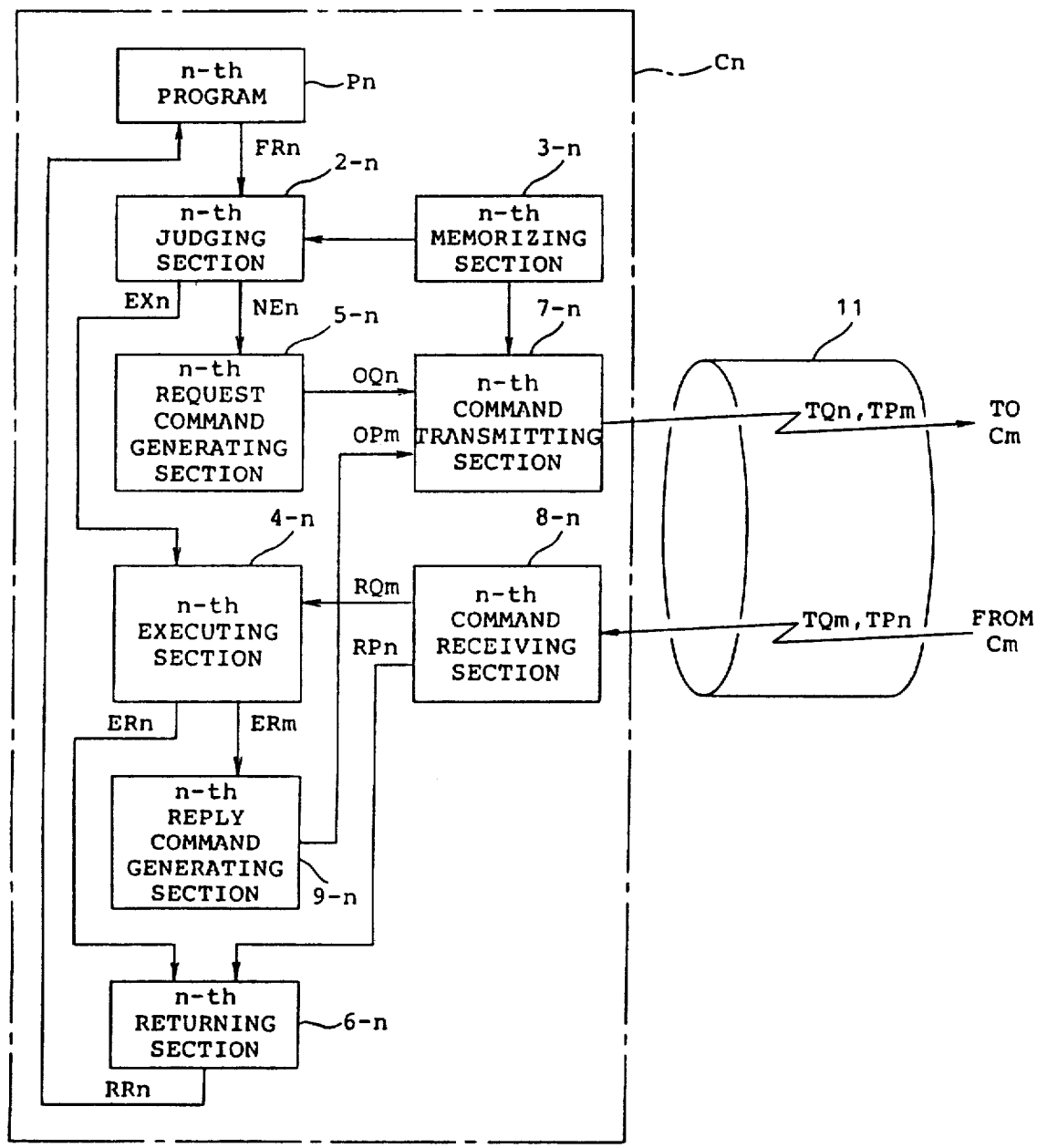
FIG. 2 shows a block diagram of a computer for use in the computer network system depicted in FIG. 1.

Referring to FIG. 2, the n-th computer Cn of the n-th computer name comprises an n-th judging section 2-n supplied with an n-th request FRn indicative of a particular one of the first through the n-th functions F1 to FN from the n-th program Pn. The n-th judging section 2-n judges in cooperation with an n-th memorizing section 3-n whether or not the particular function can be executed by the n-th computer Cn in response to the n-th request FRn by using memorized information which is memorized in the n-th memorizing section 3-n.

Turning to FIG. 3 and again referring to FIG. 2, the n-th memorizing section 3-n is loaded with a table divided into a first field 301 and a second field 302. The first field 301 memorizes the first through the N-th function names indicative of the first through the N-th functions F1 to FN. The second field 302 memorizes the first through the N-th computer names indicative of the first through the N-th computers C1 to CN. The first through the N-th function names are memorized in the table in correspondence to the first through the N-th computers names. With reference to the table, it is understood that the first function F1 of the first function name can be executed by the first computer C1 of the first computer name, the i-th function Fi of the i-th function name can be executed by the i-th computer Ci of the i-th computer name, and the N-th function FN of the N-th function name can be executed by the N-th computer CN of the N-th computer name, as mentioned before. At any rate, the n-th memorizing section 3-n memorizes a combination of the function names and the computer names as the n-th memorized information.

Figure 3:
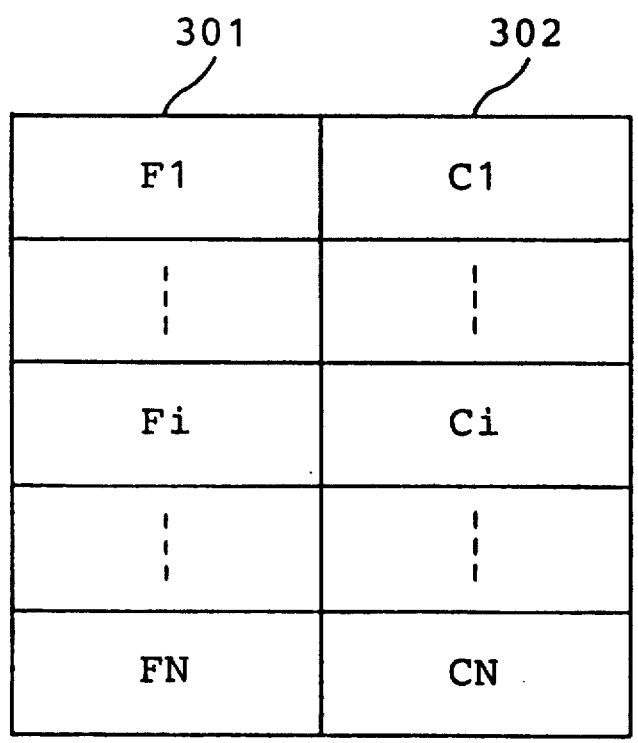
FIG. 3 is a memory map for use in describing the operation of the computer illustrated in FIG. 2.

Turning back to FIG. 2 leaving FIG. 3, the n-th judging section 2-n produces the n-th request FRn as an n-th executable signal EXn when the particular function can be executed by the n-th computer Cn. The n-th judging section 2-n produces the n-th request FRn as an n-th non-executable signal NEn when the particular function can not be executed by the n-th computer Cn. The n-th judging section 2-n is connected to an n-th executing section 4-n and to an n-th request command generating section 5-n. The n-th executable signal EXn is supplied to the n-th executing section 4-n. The n-th non-executable signal NEn is supplied to the n-th request command generating section 5-n.

Responsive to the n-th executable signal EXn, the n-th executing section 4-n executes the particular function indicated by the n-th executable signal EXn to produce an n-th execution result ERn. The n-th executing section 4-n is connected to an n-th returning section 6-n. The n-th execution result ERn is delivered to the n-th returning section 6-n. Responsive to the n-th execution result ERn, the n-th returning section 6-n acts as an n-th result returning arrangement for returning the n-th execution result ERn to the n-th program Pn as an n-th return result RRn.

Supplied with the n-th non-executable signal NEn from the n-th judging section 2-n, the n-th request command generating section 5-n generates an n-th original request command OQn indicative of the n-th request FRn. The n-th request command generating section 5-n is connected to an n-th command transmitting section 7-n which is connected to the n-th memorizing section 3-n and to the communication line 11. The n-th original request command OQn is sent to the n-th command transmitting section 7-n. Supplied with the n-th original request command OQn, the n-th command transmitting section 7-n serves as an n-th request transmitting arrangement for transmitting, as an n-th transmission request command TQn, the n-th original request command OQn through the communication line 11 to an m-th computer Cm which is at least one of the first through the N-th computers C1 to CN except for the n-th computer Cn, namely, at least one of the first through the (n−1)-th and the (n+1)-th through the N-th computers, and is capable of executing the particular function. The n-th command transmitting section 7-n decides in cooperation with the n-th memorizing section 3-n the m-th computer Cm in response to the n-th original request command OQn by using the n-th memorized information.

In FIG. 2, the suffix "n" will be read as another suffix "m", depending on the context. The m-th computer Cm comprises an m-th command receiving section 8-m which is connected to the communication line 11 and which is similar to an n-th command receiving section 8-n depicted in the n-th computer Cn. The m-th command receiving section 8-m acts as an m-th request receiving arrangement for receiving the n-th transmission request command TQn via the communication line 11 as an n-th received request command RQn. The m-th command receiving section 8-m is connected to an m-th executing section 4-m. The n-th received request command RQn is supplied to the m-th executing section 4-m. Responsive to the n-th received request command RQn, the m-th executing section 4-m executes the particular function indicated by the n-th received request command RQn to produce the n-th execution result ERn. The m-th executing section 4-m is connected to an m-th reply command generating section 9-m. The n-th execution result ERn is delivered to the m-th reply command generating section 9-m. Responsive to the n-th execution result ERn, the m-th reply command generating section 9-m generates an n-th original reply command OPn indicative of the n-th execution result ERn. The m-th reply command generating section 9-m is connected to an m-th command transmitting section 7-m. The n-th original reply command OPn is supplied to the m-th command transmitting section 7-m. The m-th command transmitting section 7-m acts as an m-th reply transmitting arrangement for transmitting the n-th original reply command OPn through the communication line 11 to the n-th computer Cn as the n-th transmission reply command TPn.

Supplied with the n-th transmission reply command TPn, the n-th command receiving section 8-n serves as an n-th reply receiving arrangement for receiving the n-th transmission reply command TPn via the communication line 11 as an n-th received reply command RPn. The n-th command receiving section 8-n is connected to the n-th returning section 6-n. The n-th received reply command RPn is supplied to the n-th returning section 6-n. Responsive to the n-th received reply command RPn, the n-th returning section 6-n acts as an n-th reply returning arrangement for returning the n-th execution result ERn indicated by the n-th received reply command RPn to the n-th program Pn as the n-th return result RPn.

Turning again to FIG. 1, the first computer C1 executes the first program P1 which includes the first function F1, the i-th function Fi, and the N-th function FN. Under the circumstances, the first computer C1 executes the first function F1 which is requested from the first program P1 by a supervisor call F1 (SVC F1). The i-th computer Ci executes the i-th function Fi which is requested from the first program P1 by SVC Fi. The N-th computer CN executes the N-th function FN which is requested from the first program P1 by SVC FN.

Figure 4:
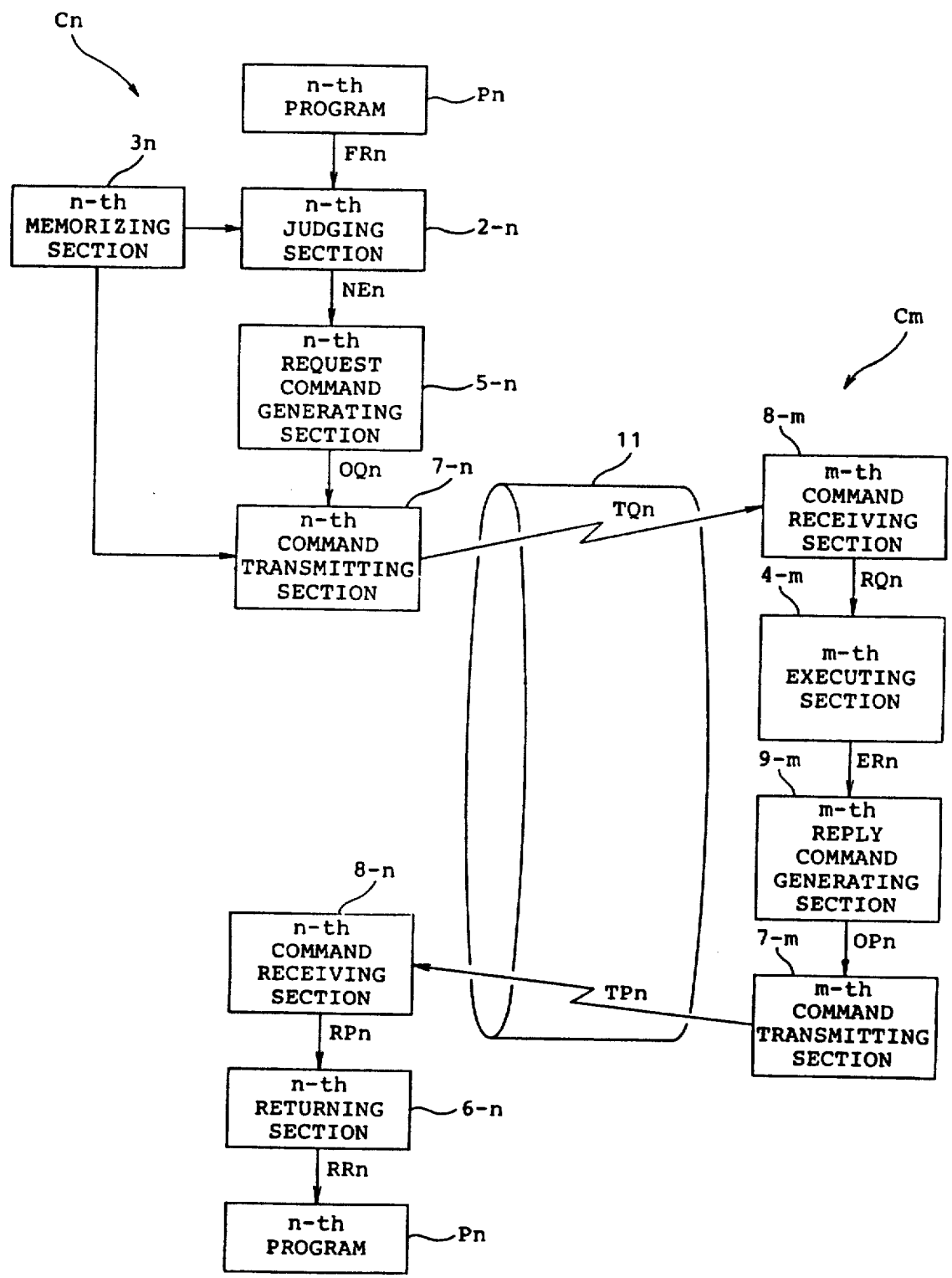
FIG. 4 is a block diagram for use in describing the operation of the computer network system illustrated in FIG. 1.

Turning to FIG. 4, the description will proceed as to the operation of n-th computer Cn of FIG. 2 and m-th computer Cm. It will be assumed that the n-th computer Cn executes the n-th program Pn, including an m-th function Fm which the n-th computer Cn is impossible to execute but the m-th computer Cm is possible.

In the n-th computer Cn, the n-th judging section 2-n is supplied with the n-th request FRn indicative of the m-th function Fm from the n-th program Pn and is supplied with the n-th memorized information from the n-th memorizing section 3-n to judge whether or not the m-th function Fm can be executed by the n-th computer Cn in response to the n-th request FRn. The n-th judging section 2-n delivers the n-th request FRn to the n-th request command generating means 5-n as the n-th non-executable signal NEn. This is because the m-th function Fm can not be executed by the n-th computer Cn. Responsive to the n-th non-executable signal NEn, the n-th request command generating means 5-n generates the n-th original request command OQn indicative of the n-th request FRn and sends the n-th original request command OQn to the n-th command transmitting section 7-n. Supplied with the n-th original request command OQn and with the n-th memorized information, the n-th command transmitting section 7-n decides a specific computer to which the n-th original request command OQn should be transmitted in response to the n-th original request command OQn. In the illustrated example, the n-th command transmitting section 7-n decides the m-th computer Cm as the specific computer. This is because the m-th computer Cm can execute the m-th function Fm. The n-th command transmitting section 7-n transmits the n-th original request command OQn through the communication line 11 to the m-th computer Cm as the n-th transmission request command TQn.

In the m-th computer Cm, the m-th command receiving section 8-m receives the n-th transmission request command TQn via the communication line 11 as the n-th received request command RQn. The n-th received request command RQn is supplied to the m-th executing section 4-m. Responsive to the n-th received request command RQn, the m-th executing section 4-m executes the m-th function Fm indicated by the n-th received request command RQn to deliver the n-th execution result ERn to the m-th reply command generating section 9-m. Responsive to the n-th execution result ERn, the m-th reply command generating section 9-m generates the n-th original reply command OPn indicative of the n-th execution result ERn and sends the n-th original reply command OPn to the m-th command transmitting section 7-m. Supplied with n-th original reply command OPn, the m-th command transmitting section 7-m transmits the n-th original reply command OPn through the communication line 11 to the n-th computer Cn as the n-th transmission reply command TPn.

In the n-th computer Cn, the n-th command receiving section 8-n receives the n-th transmission reply command TPn via the communication line 11 as the n-th received reply command RPn. The n-th command receiving section 8-n delivers the n-th received reply command RPn to the n-th returning section 6-n. Responsive to the n-th received reply command RPn, the n-th returning section 6-n returns the n-th execution result ERn indicated by the n-th received reply command RPn to the n-th program Pn as the n-th return result RPn.

Figure 5:
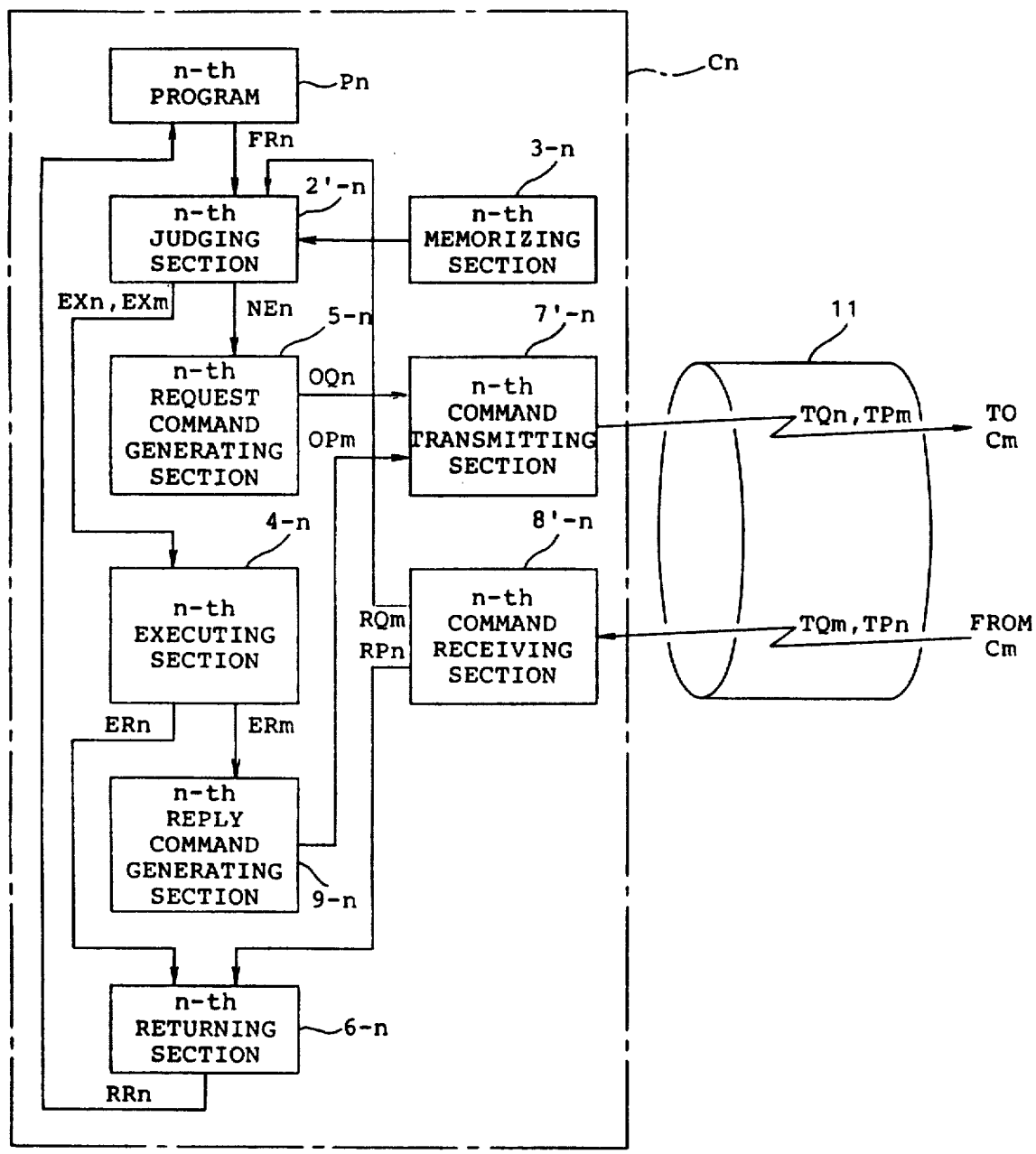
FIG. 5 shows a block diagram of a computer for use in a computer network system according to a second embodiment of this invention.

Referring to FIG. 5 together with FIG. 1, there is described a computer network system according to the second embodiment of the present invention. The n-th computer Cn is similar to that illustrated in FIG. 2 except that the n-th judging section, the n-th command transmitting section, and the n-th command receiving section are modified from those illustrated in FIG. 2, as will later become clear. The n-th judging section, the n-th command transmitting section, and the n-th command receiving section are therefore depicted at 2'-n, 7'-n, and 8'-n.

Supplied with the n-th original request command OQn, the n-th command transmitting section 7'-n acts as an n-th request transmitting arrangement for transmitting, as an n-th transmission request command TQn, the n-th original request command OQn through the communication line 11 to remaining computers which are the first through the N-th computers except for the n-th computer Cn. It will be assumed that an m-th computer Cm is one of the remaining computers.

In FIG. 5, the suffix "n" will be read as another suffix "m" depending on the context. The m-th computer Cm comprises an m-th command receiving section 8'-m. The m-th command receiving section 8'-m serves as an m-th request receiving arrangement for receiving the n-th transmission request command TQn via the communication line 11 as the n-th received request command RQn. The m-th command receiving section 8'-m is connected to an m-th judging section 2'-m. The n-th received request command RQn is supplied to the m-th judging section 2'-m. Responsive to the n-th received request command RQn, the m-th judging section 2'-m acts as an m-th deciding means for deciding whether or not the particular function indicated by the n-th received request command RQn can be executed by the m-th computer Cm. The m-th judging section 2'-m delivers the n-th received request command RQn to the m-th executing section 4-m as an n-th executable signal EXn. Responsive to the n-th executable signal EXn, the m-th executing section 4-m executes the particular function indicated by the n-th executable signal EXn to send the n-th execution result ERn to the m-th reply command generating section 9-m. On reception of the n-th execution result ERn, the m-th reply command generating section 9-m operates in the manner similar to the n-th reply command generating section 9-n illustrated in FIG. 2.

Figure 6:
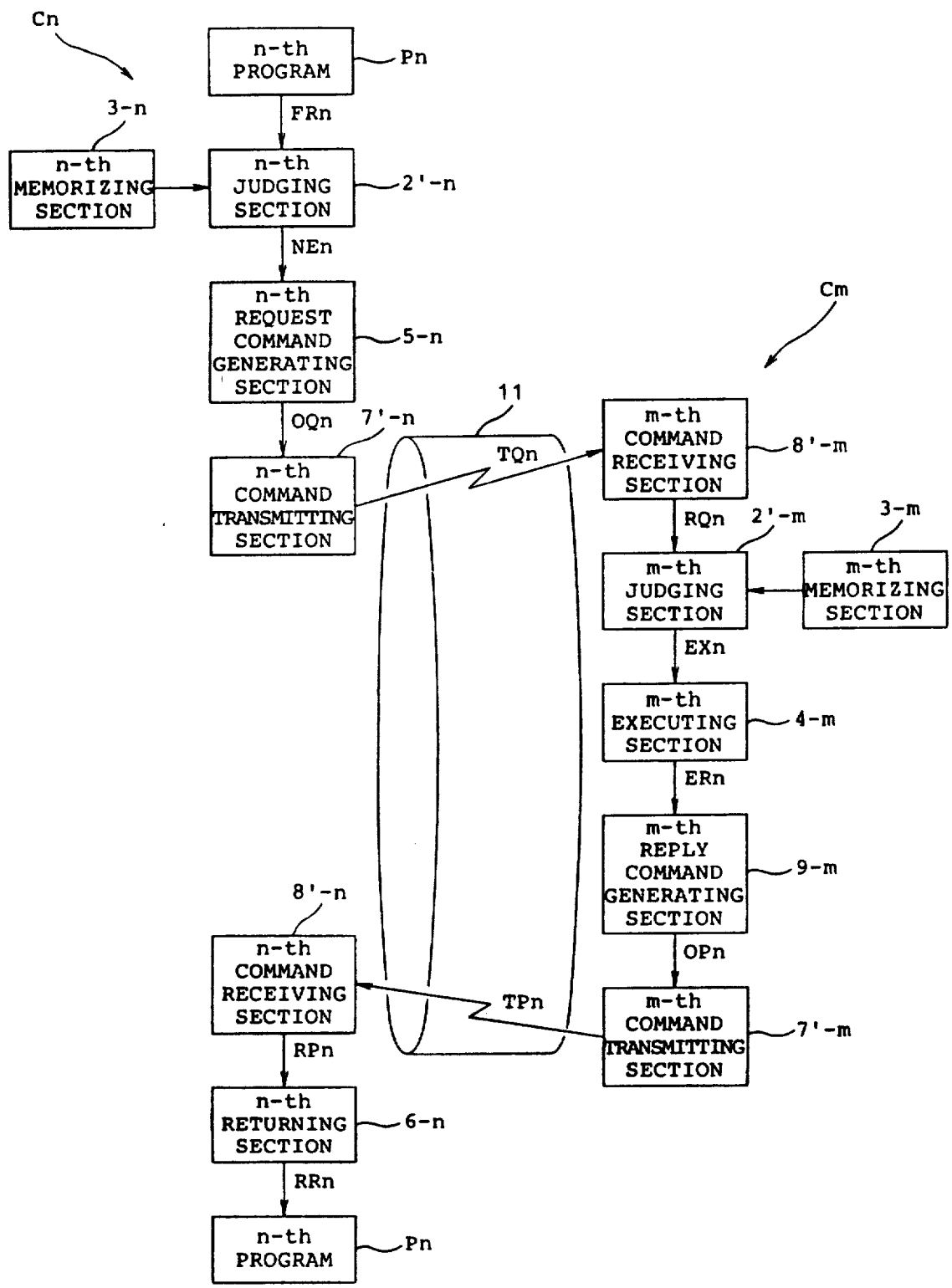
FIG. 6 is a block diagram for use in describing the operation of the computer network system which comprises the computers of the type illustrated in FIG. 5.

Turning to FIG. 6, the description will proceed to operation of the n-th computer Cn of FIG. 5 and the m-th computer Cm which is one of the first through the N-th computers C1 to CN except for the n-th computer Cn. It will be assumed that the n-th computer Cn executes the n-th program Pn including an m-th function Fm which the n-th computer Cn is impossible to execute but the m-th computer Cm is possible.

In the n-th computer Cn, the judging section 2'-n is supplied with the n-th request FRn indicative of the m-th function Fm from the n-th program Pn and is supplied with the n-th memorized information from the n-th memorizing section 3-n to judge whether or not the m-th function Fm can be executed by the n-th computer Cn in response to the n-th request FRn. The n-th judging section 2'-n delivers the n-th request FRn to the n-th request command generating means 5-n as the n-th non-executable signal NEn. This is because the m-th function Fm cannot be executed by the n-th computer Cn. Responsive to the n-th non-executable signal NEn, the n-th request command generating means 5-n generates the n-th original request command OQn indicative of the n-th request FRn and sends the n-th original request command OQn to the n-th command transmitting section 7'-n. Supplied with the n-th original request command OQn, the n-th command transmitting section 7'-n transmits, as the n-th transmission request command TQn, the n-th original request command OQn through the communication line 11 to the remaining computers which are the first through the N-th computers C1 to CN except for the n-th computer Cn.

In the m-th computer Cm, the m-th command receiving section 8'-m receives the n-th transmission request command TQn via the communication line 11 as the n-th received request command RQn. The n-th received request command RQn is supplied to the m-th judging section 2'-m. Responsive to the n-th received request command RQn and supplied with the m-th memorized information from the m-th memorizing section 3-m, the m-th judging section 2'-m judges whether or not the m-th function Fm indicated by the n-th received request command RQn can be executed by the m-th computer Cm. The m-th judging section 2'-m delivers the n-th received request command RQn to the m-th executing section 4-m as the n-th executable signal NXn. This is because the m-th function Fm can be executed by the m-th computer Cm. Responsive to the n-th executable signal EXn, the m-th executing section 4-m executes the m-th function Fm indicated by the n-th executable signal NXn to deliver the n-th execution result ERn to the m-th reply command generating section 9-m. Responsive to the n-th execution result ERn, the m-th reply command generating section 9-m generates the n-th original reply command OPn indicative of the n-th execution result ERn and sends the n-th original reply command OPn to the m-th command transmitting section 7'-m. Supplied with the n-th original reply command OPn, the m-th command transmitting section 7'-m transmits the n-th original reply command OPn through the communication line 11 to the n-th computer Cn as the n-th transmission reply command TPn.

In the n-th computer Cn, the n-th command receiving section 8'-n receives the n-th transmission reply command TPn via the communication line 11 as the n-th received reply command RPn. The n-th command receiving section 8'-n delivers the n-th received reply commmand RPn to the n-th returning section 6-n. Responsive to the n-th received reply command RPn, the n-th returning section 6-n returns the n-th execution result ERn indicated by the n-th received reply command RPn to the n-th program Pn as the n-th return result RRn.

Figure 7:
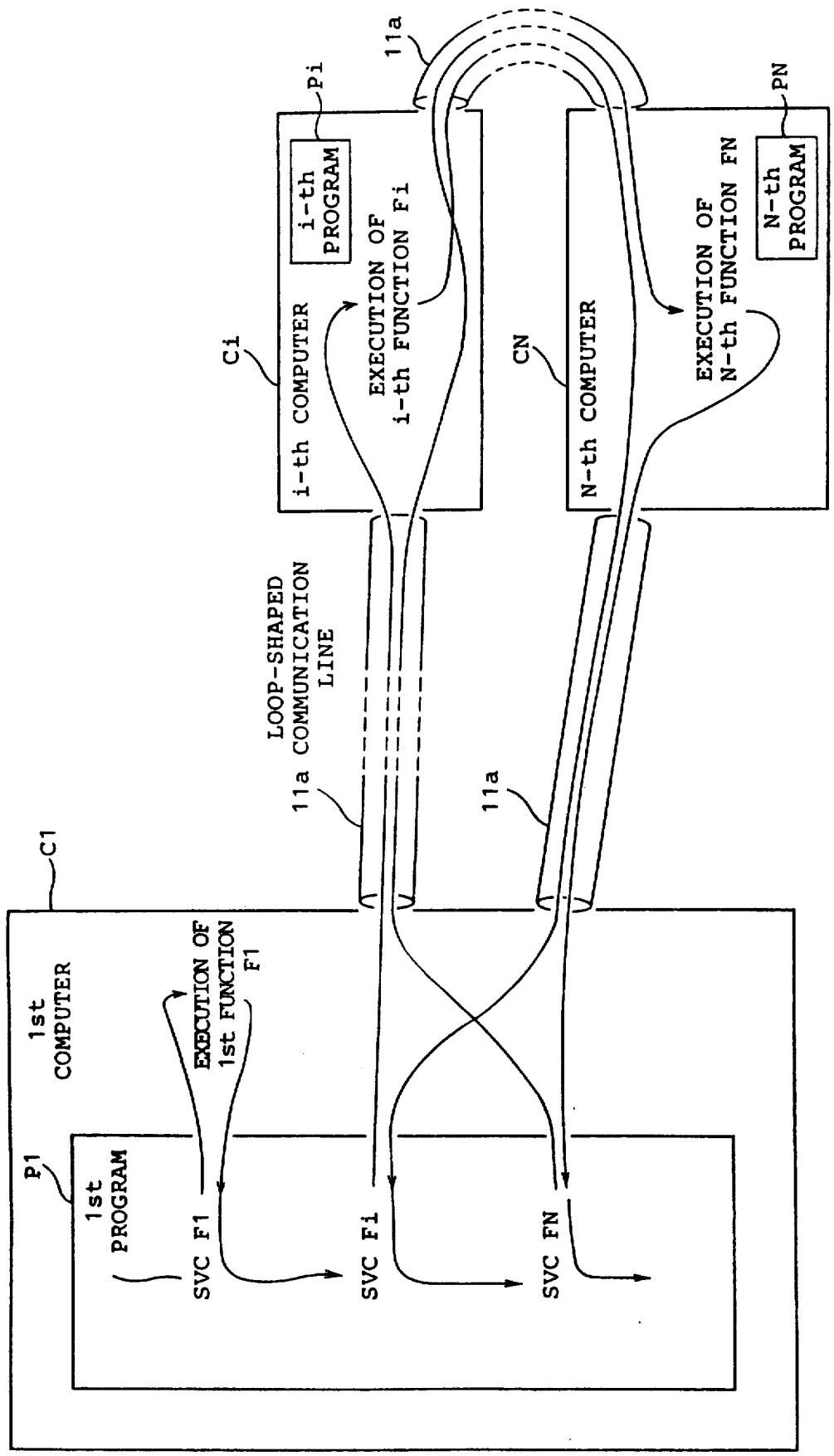
FIG. 7 shows a block diagram of a computer network system according to a third embodiment of this invention.
Figure 8:
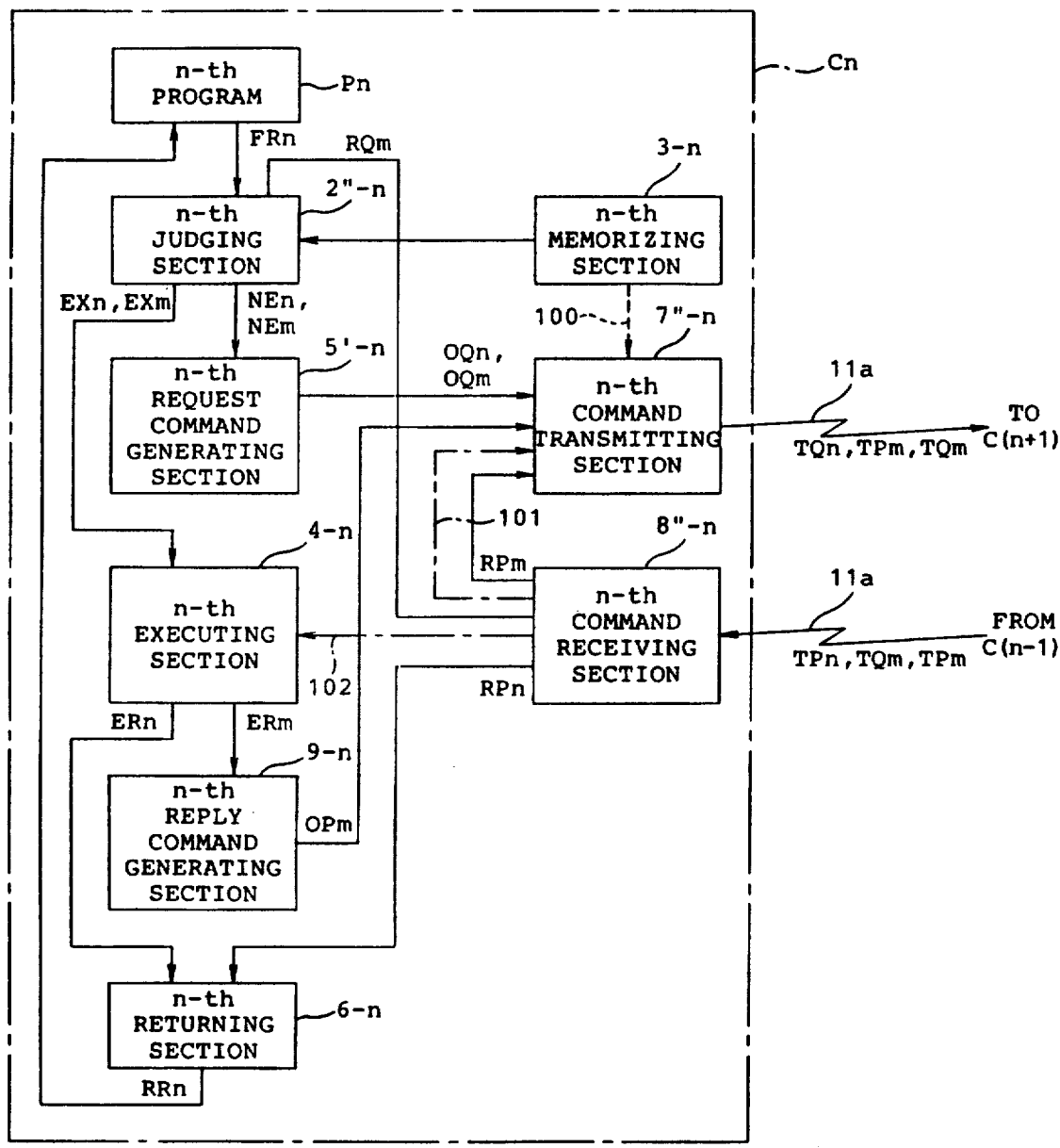
FIG. 8 shows a block diagram of a computer for use in the computer network system shown in FIG. 7.

Referring to FIGS. 7 and 8, there is described a computer network system according to the third embodiment of the present invention. Similar parts are designated by like reference numerals, as in the foregoing. The computer network system comprises the first through the N-th computers C1 to CN which are sequentially connected to a loop-shaped communication line 11a for carrying out unidirectional communication. The n-th computer Cn transmits an n-th transmission signal to an $(n+1)$-th computer $C(n+1)$. The $(n+1)$-th computer $C(n+1)$ is the first computer C1 when the n-th computer Cn is the N-th computer CN. The n-th computer Cn receives an $(n-1)$-th transmission signal from an $(n-1)$-th computer $C(n-1)$ as an n-th reception signal. The $(n-1)$-th computer $C(n-1)$ is the N-th computer CN when the n-th computer Cn is the first computer C1.

In FIG. 8, the n-th computer Cn is similar to that illustrated in FIG. 5 except that the n-th judging section, the n-th request command generating section, the n-th command transmitting section, and the n-th command receiving section are modified from those illustrated in FIG. 5, as will later become clear. The n-th judging section, the n-th request command generating section, the n-th command transmitting section, and the n-th command receiving section are therefore depicted at 2''-n, 5'-n, 7''-n, and 8''-n, respectively. It will be assumed that an m-th computer Cm is one of remaining computers which are the first through the N-th computers C1 to CN, except for the n-th computer Cn.

The n-th command receiving section 8''-n acts as an n-th request receiving arrangement for receiving, as an m-th received request RQm being the n-th reception signal, an m-th transmission request command TQm issued from the m-th computer Cm via the communication line 11a from the $(n-1)$-th computer $C(n-1)$. The m-th received request RQm is sent to the n-th judging section 2''-n. Responsive to the m-th received request command RQm, the n-th judging section 2''-n judges whether or not the particular function indicated by the m-th received request command RQm can be executed by the n-th computer Cn. The n-th judging section 2''-n delivers the m-th received request command RQm to the n-th request command generating section 5'-n as an m-th non-executable signal NEm when the particular function indicated by the m-th received request command RQm can not be executed by the n-th computer Cn. Responsive to the m-th non-executable signal NEm, the n-th request command generating section 5'-n generates an m-th original request command OQm indicative of an m-th request FRm which is supplied from an m-th program Pm in the m-th computer Cm. The m-th original request command OQm is delivered to the n-th command transmitting section 7"-n. Supplied with the m-th original request command OQm, the n-th command transmitting section 7"-n transmits the m-th original request command OQm through the communication line 11a to the (n+1)-th computer C(n+1) as an m-th transmission request command TQm being the n-th transmission signal.

The n-th command receiving section 8"-n serves as the n-th reply receiving arrangement for receiving, as an m-th received reply command RPm being the n-th reception signal, an m-th transmission reply command TPm via the communication line 11a from the (n−1)-th computer C(n−1). The n-th command receiving section 8"-n is connected to the n-th command transmitting section 7"-n. The m-th received reply command RPm is supplied to the n-th command transmitting section 7"-n. Supplied with m-th received reply command RPm, the n-th command transmitting section 7"-n acts as an n-th transmitting arrangement for transmitting the m-th received reply command RPm through the communication line 11a to the (n+1)-th computer C(n+1) as the m-th transmission reply command TPm.

Figure 9A:
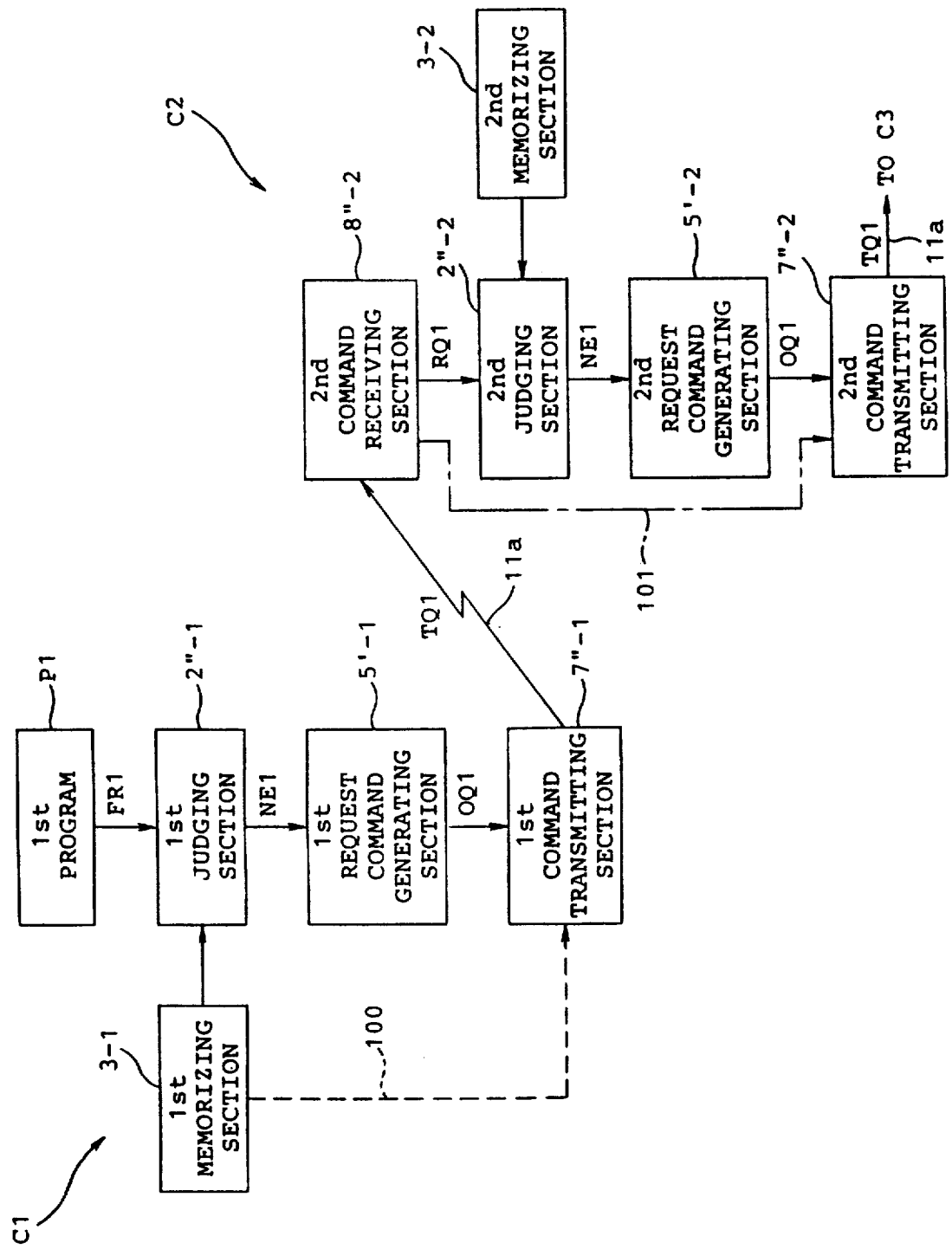
FIGS. 9(a) and (b) collectively show a block diagram for use in describing the operation of the computer network system illustrated in FIG. 7.
Figure 9B:
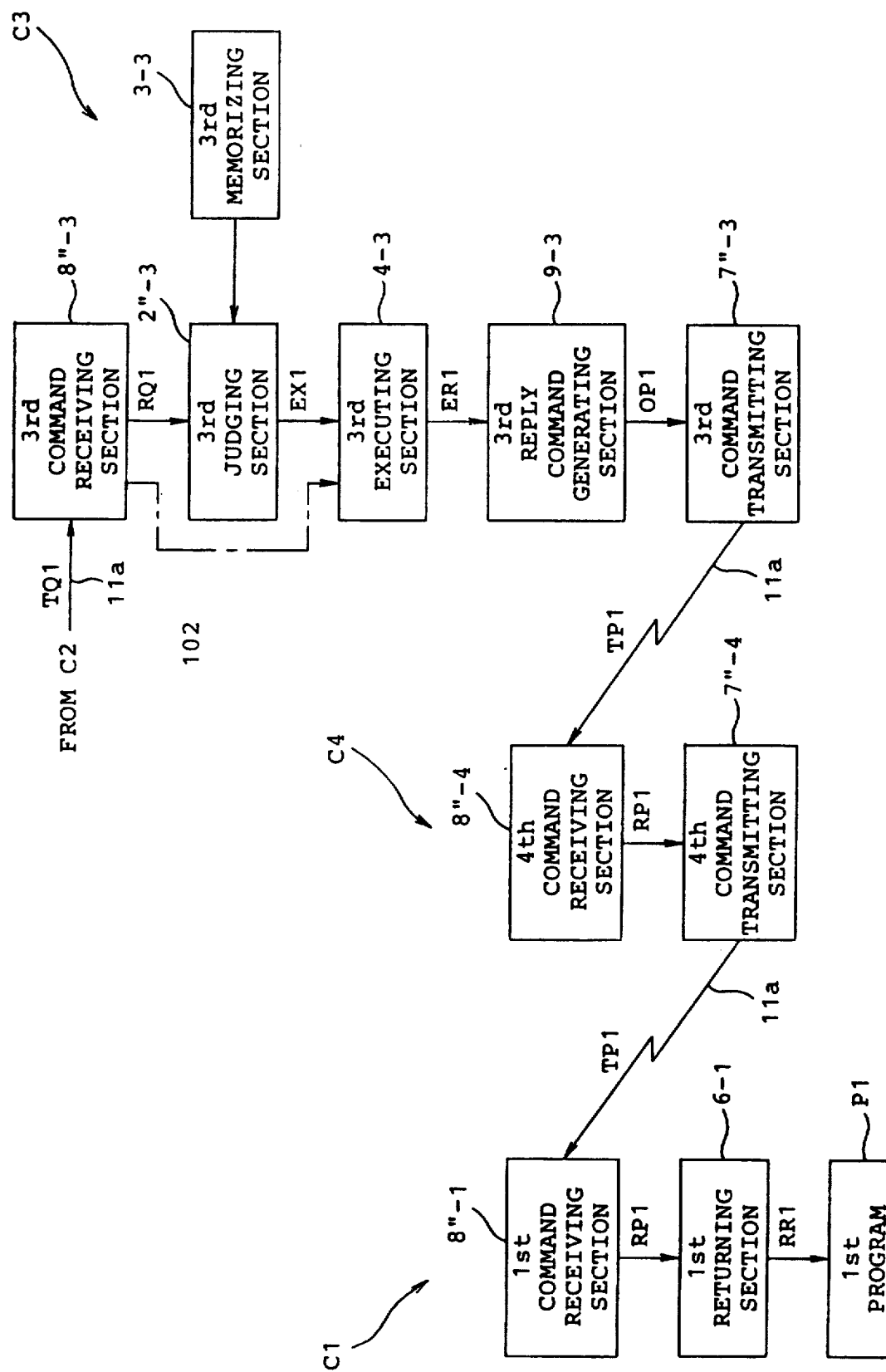

Turning to FIG. 9, attention will be directed to operation of the computer network system comprising first through fourth computers C1, C2, C3, and C4 each of which is similar to the n-th computer Cn of FIG. 8. It will be assumed that the first computer C1 executes the first program P1 including a third function F3 which the third computer C3 is only possible to execute.

In the first computer C1, the first judging section 2"-1 is supplied with the first request FR1 indicative of the third function F3 from the first program P1. Responsive to the first request FR1 and supplied with the first memorized information from the first memorizing section 3-1, the first judging section 2"-1 judges whether or not the third function F3 can be executed by the first computer C1. The first judging section 2"-1 delivers the first request FR1 to the first request command generating means 5'-1 as the first non-executable signal NE1. This is because the third function F3 cannot be executed by the first computer C1. Responsive to the first non-executable signal NE1, the first request command generating means 5'-1 generates the first original request command OQ1 indicative of the first request FR1 and sends the first original request command OQ1 to the first command transmitting section 7"-1. Supplied with the first original request command OQ1, the first command transmitting section 7"-1 transmits, as the first transmission request command TQ1, the first original request command OQ1 through the communication line 11a to the second computer C2.

In the second computer C2, the second command receiving section 8"-2 receives the first transmission request command TQ1 via the communication line 11a as the first received request command RQ1. The first received request command RQ1 is supplied to the second judging section 2"-2. Responsive to the first received request command RQ1 and supplied with the second memorized information from the second memorizing section 3-2, the second judging section 2"-2 judges whether or not the third function Fm indicated by the first received request command RQ1 can be executed by the second computer C2. The second judging section 2"-2 delivers the first received request command RQ1 to the second request command generating means 5'-2 as the first non-executable signal NE1. This is because the third function F3 cannot be executed by the second computer C2. Responsive to the first non-executable signal NE1, the second request command generating means 5'-2 generates the first original request command OQ1 indicative of the first request FR1 and sends the first original request command OQ1 to the second command transmitting section 7"-2. Supplied with the first original request command OQ1, the second command transmitting section 7"-2 transmits, as the first transmission request command TQ1, the first original request command OQ1 through the communication line 11a to the third computer C3.

In the third computer C3, the third command receiving section 8"-3 receives the first transmission request command TQ1 via the communication line 11a as the first received request command RQ1. The first received request command RQ1 is supplied to the third judging section 2"-3. Responsive to the first received request command RQ1 and supplied with the third memorized information from the third memorizing section 3-3, the third judging section 2"-3 judges whether or not the third function F3 indicated by the first received request command RQ1 can be executed by the third computer C3. The third judging section 2"-3 delivers the first received request command RQ1 to the third executing section 4-3 as the first executable signal NX1. This is because the third function F3 can be executed by the third computer C3. Responsive to the first executable signal EX1, the third executing section 4-3 executes the third function F3 indicated by the first executable signal NX1 to deliver the first execution result ER1 to the third reply command generating section 9-3. Responsive to the first execution result ER1, the third reply command generating section 9-3 generates the first original reply command OP1 indicative of the first execution result ER1 and sends the first original reply command OP1 to the third command transmitting section 7"-3. Supplied with first original reply command OP1, the third command transmitting section 7"-3 transmits the first original reply command OP1 through the communication line 11a to the fourth computer C4 as the first transmission reply command TP1.

In the fourth computer C4, the fourth command receiving section 8"-4 receives the first transmission reply command TP1 via the communication line 11a as the first received reply command RP1. The fourth command receiving section 8"-4 delivers the first received reply command RP1 to the fourth command transmitting section 7"-4. Supplied with the first received reply command RP1, the fourth command transmitting section 7"-4 transmits the received reply command RP1 through the communication line 11a to the first computer C1 as the first transmission reply command TP1.

In the first computer C1, the first command received section 8-1 receives the first transmission reply command TP1 via the communication line 11a as the first received reply command RP1. The first command receiving section 8"-1 delivers the first received reply command RP1 to the first returning section 6-1. Responsive to the first received reply command RP1, the first returning section 6-1 returns the first execution result ER1 indicated by the first received reply command RP1 to the first program P1 as the first return result RR1.

In the third embodiment, the n-th memorizing section 3-n is connected only to the n-th judging section 2''-n. However, the n-th memorizing section 3-n may also be connected to the n-th command transmitting section 7''-n through a dashed line 100 as shown in FIGS. 8 and 9(a). In this case, the n-th command transmitting section 7''-n transmits the n-th transmission request command TQn through the communication line 12a to the (n+1)-th computer C(n+1) with a destination address having a particular computer name included in the n-th transmission request command TQn. The particular computer name represents a particular computer to which the n-th transmission request command TQn should be transmitted and which is capable of executing a specific function included in the n-th program Pn that is indicated by the n-th transmission request command TQn. In addition, the m-th received request RQm is delivered from the n-th command receiving section 8'''-n to either the n-th command transmitting section 7''-n through a first (dot-and-dash) line 101 or the n-th executing section 4-n through a second (dot-and-dash) line 102 as shown in FIG. 8 and FIGS. 9(a) and (b). More specifically, the m-th received request RQm is delivered to the n-th command transmitting section 7''-n through the first (dot-and-dash) line 101 when the destination address of the m-th received request RQm does not indicate the n-th computer Cn. On the other hand, the m-th received request RQm is delivered to the n-th executing section 4-n through the second (dot-and-dash) line 102 when the destination address of the m-th received request RQm indicates the n-th computer Cn.

What is claimed is:

1. In a computer network system comprising first through N-th computers connected to a communication line where N represents a predetermined natural number which is not less than two, an n-th computer executing an n-th program which includes one of a plurality of functions, where n represents each of 1 through N, wherein said n-th computer comprises:

judging means supplied with a request indicative of one of the functions from said n-th program for judging whether or not said one of the functions can be executed by said n-th computer in response to said request, said judging means producing said request as a non-executable signal when said one of the functions be executed by said n-th computer;

request command generating means connected to said judging means and responsive to said non-executable signal for generating an original request command indicative of said request; and request transmitting means connected to said request command generating means and to said communication line for transmitting, as a transmission request command, said original request command through said communication line to an m-th computer alone which is at least one of said first through said N-th computers except for said n-th computer, said m-th computer executing said one of the functions;

said m-th computer comprising:

request receiving means connected to said communication line for receiving said transmission request command via said communication line as a received request command;

executing means connected to said request receiving means and responsive to said received request command for executing said one of the functions indicated by said received request command to produce an execution result;

reply command generating means connected to said executing means and responsive to said execution result for generating an original reply command indicative of said execution result; and reply transmitting means connected to said reply command generating means and to said communication line for transmitting, as a transmission reply command, said original reply command through the communication line to said n-th computer.

2. A computer network system as claimed in claim 1, wherein said n-th computer comprises:

reply receiving means connected to said communication line for receiving said transmission reply command via said communication line as a received reply command; and reply returning means connected to said reply receiving means and responsive to said received reply command for returning said execution result indicated by said received reply command to said n-th program.

3. A computer network system as claimed in claim 1, said judging means producing said request as an executable signal when said one of the functions can be executed by said n-th computer, wherein said n-th computer comprises:

executing means connected to said judging means and responsive to said executable signal for executing said one of the functions indicated by said executable signal to produce an execution result; and result returning means connected to said executing means and responsive to said execution result for returning said execution result to said n-th program.

4. A computer network system as claimed in claim 1, wherein said n-th computer comprises memorizing means for memorizing, as memorized information, a combination of function names indicative of said plurality of functions, respectively, and computer names indicative of said first through said N-th computers, respectively, said judging means judging in cooperation with said memorizing means whether or not said one of the functions can be executed by said n-th computer in responsive to said request by using said memorized information.

5. A computer network system as claimed in claim 4, wherein said request transmitting means cooperatively selects with said memorizing means said m-th computer, in response to said original request command by using said memorized information.

6. A computer network system as claimed in claim 1, wherein each of said functions consists of an external procedure.

* * * * *